(12) United States Patent
Shiang et al.

(10) Patent No.: US 6,630,077 B2
(45) Date of Patent: Oct. 7, 2003

(54) TERBIUM- OR LUTETIUM - CONTAINING GARNET PHOSPHORS AND SCINTILLATORS FOR DETECTION OF HIGH-ENERGY RADIATION

(75) Inventors: Joseph John Shiang, Niskayuna, NY (US); Anant Achyut Setlur, Niskayuna, NY (US); Alok Mani Srivastava, Niskayuna, NY (US); Holly Ann Comanzo, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 72 days.

(21) Appl. No.: 09/682,737

(22) Filed: Oct. 11, 2001

(65) Prior Publication Data

US 2003/0075706 A1 Apr. 24, 2003

(51) Int. Cl.$^7$ ................................. C09K 11/08
(52) U.S. Cl. ................ 252/301.4 R; 378/19; 378/98.8; 250/363.04
(58) Field of Search ............ 252/301.4 R; 378/19; 378/98.8; 250/363.04

(56) References Cited

U.S. PATENT DOCUMENTS

| | | |
|---|---|---|
| 3,974,389 A | 8/1976 | Ferri et al. |
| 4,405,691 A | 9/1983 | Yale |
| 4,421,671 A | 12/1983 | Cusano et al. |
| 4,507,560 A | 3/1985 | Mathers et al. |
| 5,096,614 A | 3/1992 | Yale et al. |
| 6,143,200 A | 11/2000 | Akiwa et al. |
| 6,246,744 B1 * | 6/2001 | Duclos et al. .............. 378/19 |
| 2002/0195587 A1 * | 12/2002 | Srivastava et al. .... 252/301.4 R |

FOREIGN PATENT DOCUMENTS

| | | | |
|---|---|---|---|
| DE | 19934126 | * | 1/2001 |
| JP | 74 (49)-3629 B | * | 1/1974 |
| JP | 2001-192655 | * | 7/2001 |
| WO | WO 01/08452 | * | 2/2001 |
| WO | WO 01/08453 | * | 2/2001 |

OTHER PUBLICATIONS

G. Blasse and B.C. Grabmaier, "Luminescent Materials," pp. 166–168, Springer–Verlag, Berlin (1994).
Valery I. Chani et al., "Melt Growth of (Tb,Lu)3 Al5O12 Mixed Garnet Fiber Crystals," Journal of Crystal Growth, vol. 212, pp. 469–475, (2000).

* cited by examiner

Primary Examiner—C. Melissa Koslow
(74) Attorney, Agent, or Firm—Toan P. Vo; Patrick K. Patnode

(57) ABSTRACT

Scintillator compositions having a garnet crystal structure useful for the detection of high-energy radiation, such as X, β, and γ radiation, contain (1) at least one of terbium and lutetium; (2) at least one rare earth metal; and (3) at least one of Al, Ga, and In. Terbium or lutetium may be partially substituted with Y, La, Gd, and Yb. In particular, the scintillator composition contains both terbium and lutetium. The scintillators are characterized by high light output, reduced afterglow, short decay time, and high X-ray stopping power.

33 Claims, 3 Drawing Sheets

TERBIUM- OR LUTETIUM - CONTAINING GARNET PHOSPHORS AND SCINTILLATORS FOR DETECTION OF HIGH-ENERGY RADIATION

BACKGROUND OF INVENTION

The present invention relates to terbium- or lutetium-containing phosphors and scintillators having a garnet structure activated with rare-earth metal ions useful for the detection of high-energy radiation. In particular, the present invention relates to a terbium or lutetium aluminum oxide garnet X-ray phosphor or scintillator activated with cerium. The present invention also relates to X-ray detectors and detection systems incorporating an X-ray phosphor or scintillator comprising a terbium- or lutetium-containing garnet activated with rare-earth metal ions.

The terms "phosphor" and "scintillator" are used herein in an interchangeable way to mean a solid-state luminescent material that emits visible light in response to stimulation by high-energy radiation such as X, $\beta$, or $\gamma$ radiation. The term "high-energy radiation" means electromagnetic radiation having energy higher than that of ultraviolet radiation. Solid-state scintillator materials are in common use as component of radiation detectors in apparatuses such as counters, image intensifiers, and computed tomography ("CT") scanners. Scintillator materials especially find widespread use in X-ray detectors. One embodiment of the present generation of solid-state ceramic scintillators comprises oxide mixtures in which a rare-earth oxide is present as an activator, along with various combined matrix elements, which are also usually rare-earth oxides. Other metallic compounds may also be present as additives for specific purposes. These scintillators have been characterized by the advantageous properties of high efficiency, moderate decay time, low afterglow and little or no radiation damage upon exposure to high X-ray doses.

One important property of CT systems is scan time which is the time required for a CT system to scan and acquire an image of a slice of the object under observation. Scan times of CT systems are related to primary decay time (sometimes simply "decay time"hereinafter) of the scintillator roughly by a factor of 1000. Thus, a scintillator having a decay time of 1 millisecond will typically produce a scan time of about 1 second. The scanning units containing the present generation of scintillators have scan times on the order of 1 second, and in any event no lower than about 0.7 second.

In future generations of CT scanners and the like, shorter scan times are desired. This is true because decreasing scan time makes possible an increase in patient volume covered in a given time or an increase in the number of scans within a single breath hold. Also, it reduces image blurring due to motion of internal organs and of non-cooperating patients, including pediatric patients.

Shorter scan times are achievable if the primary decay time of the phosphor or scintillator is shortened. In general, scan time in seconds is associated with a primary decay time of an equal number of milliseconds. As the speed of data processing in CT scanners increases due to advances in electronic circuit designs, it is desired to have faster scintillators, i.e., shorter time between receipts of stimulating radiation pulses so to fully take advantage of the capability of the scanner. Therefore, any measurable percentage decrease in decay time from that exhibited by the present generation of ceramic scintillators would be a distinct improvement, particularly when accompanied by the other advantageous properties described above.

Among the preferred scintillator compositions in the present generation of CT scanners are the ceramic scintillators employing at least one of the oxides of lutetium, yttrium, and gadolinium as matrix materials. These are described in detail, for example, in U.S. Pat. Nos. 4,421,671; 4,473,513; 4,525,628; and 4,783,596. They typically comprise a major proportion of yttria ($Y_2O_3$), up to about 50 mole percent gadolinia ($Gd_2O_3$) and a minor activating proportion (typically about 0.02–12, preferably about 1–6 and most preferably about 3 mole percent) of a rare earth activator oxide. Suitable activator oxides, as described in the aforementioned patents, include the oxides of europium, neodymium, ytterbium, dysprosium, terbium, and praseodymium. Europium-activated scintillators are often preferred in commercial X-ray detectors by reason of their high luminescent efficiency, low afterglow level, and other favorable characteristics. Europium is typically present therein in amounts up to 30 and most often up to about 12, preferably in the range of 1–6 and most preferably about 3 mole percent. Decay times of such scintillators are on the order of 0.9–1.0 millisecond. However, such decay times still leave much to be desired.

The search thus continues for ceramic scintillator compositions having shorter decay times in combination with the aforementioned other advantageous properties.

SUMMARY OF INVENTION

The present invention provides improved scintillator compositions comprising a terbium- or lutetium-containing garnet activated with at least one rare-earth metal. The scintillator compositions are useful in the detection of high-energy radiation, such as X, $\beta$, or $\gamma$ radiation. Particularly, the scintillators of the present invention have higher light output, reduced afterglow, short decay time, and high X-ray stopping power in X-ray detection applications.

According to one aspect of the present invention, the scintillator compositions comprise terbium-containing garnet activated with at least one rare-earth metal having a general formula of $(G_{1-x-y}A_xRE_y)_aD_zO_{12}$, wherein G is at least one metal selected from the group consisting of Tb and Lu; A is a member selected from the group consisting of Y, La, Gd, Lu, and Yb when G is Tb, and selected from the group consisting of Y, La, Gd, Tb, and Yb when G is Lu; RE is at least one member selected from the group consisting of Ce, Pr, Nd, Sm, Eu, Dy, Ho, Er, and Tm; D is at least one member selected from the group consisting of Al, Ga, and In; a is in the range from about 2.8 to and including 3; x is in the range from 0 to about 0.5; y is in the range from about 0.0005 to about 0.2; and z is in the range from about 4 to and including 5. In one aspect of the present invention $4<z<5$.

According to another aspect of the present invention, a method for producing a rare earth-activated garnet scintillator containing Tb or Lu useful for a detection of X, $\beta$, or $\gamma$ radiation comprises the steps of: (1) providing amounts of oxygen-containing compounds of at least one first metal selected from the group consisting of terbium and lutetium; oxygen-containing compounds of at least one rare-earth metal selected from the group consisting of Ce, Pr, Nd, Sm, Eu, Dy, Ho, Er, and Tm; and oxygen-containing compounds of at least one second metal selected from the group consisting of Al, Ga, and In; the amounts of oxygen-containing compounds being selected such that the final composition of the scintillator is achieved; (2) mixing together the oxygen-containing compounds to form a mixture; (3) optionally adding at least one fluxing compound selected from the group consisting of halides and carbonates of Tb, Al, Ga, In, Y, La, Gd, Lu, Yb, Ce, Pr, Sm, Eu, Dy, Ho, Er, Tm, Na, K, Rb, and Cs in the mixture in a quantity sufficient to act as a flux; and (4) firing the mixture in a reducing atmosphere at a temperature and for a time sufficient to convert the mixture to a rare earth-activated terbium-containing garnet scintillator.

In another aspect of the present invention, a solution of amounts of oxygen-containing compounds of at least one first metal selected from the group consisting of terbium and lutetium; at least one other rare earth metal selected from the group consisting of Ce, Pr, Nd, Sm, Eu, Dy, Ho, Er, and Tm; and oxygen-containing compounds of at least one second metal selected from the group consisting of Al, Ga, and In is precipitated in a basic solution to obtain a mixture of hydroxides of the metals. The amounts of oxygen-containing compounds are selected such that the final composition of the scintillator is achieved. The mixture of precipitated hydroxides is calcined in an oxidizing atmosphere. The calcined material is further thoroughly mixed, and then fired in a reducing atmosphere at a temperature and for a time sufficient to convert the calcined mixture to rare earth-activated terbium containing garnet scintillator.

In still another aspect of the present invention, an X-ray detector is provided and comprises a scintillator comprising terbium-containing garnet activated with at least one rare-earth metal having a general formula of $(G_{1-x-y}A_xRE_y)_a D_zO_{12}$, wherein G is at least one metal selected from the group consisting of terbium and lutetium; A is a member selected from the group consisting of Y, La, Gd, Lu, and Yb when G is Tb and selected from the group consisting of Y, La, Gd, Tb, and Yb when G is Lu; RE is at least one member selected from the group consisting of Ce, Pr, Nd, Sm, Eu, Dy, Ho, Er, and Tm; D is at least one member selected from the group consisting of Al, Ga, and In; a is in the range from about 2.8 to and including 3; x is in the range from 0 to about 0.5; y is in the range from about 0.0005 to about 0.2; and z is in the range from about 4 to and including 5. In one aspect of the present invention $4<z<5$.

In still another aspect of the present invention, such an X-ray detector is incorporated in a CT system.

Other features and advantages of the present invention will be apparent from a perusal of the following detailed description of the invention and the accompanying drawings in which the same numerals refer to like elements.

DETAILED DESCRIPTION

Figure 1:
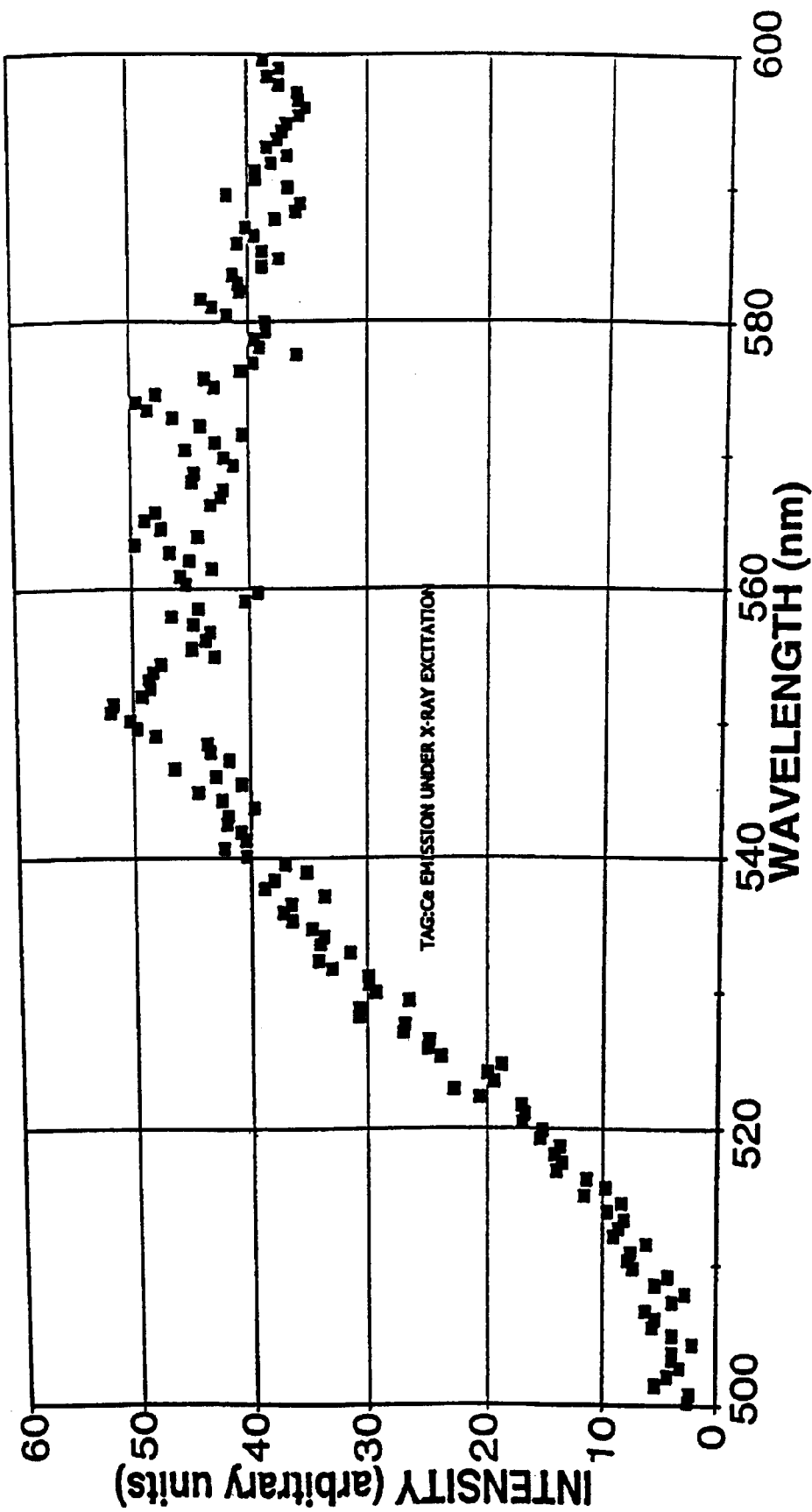
FIG. 1 is an emission spectrum of a scintillator of the present invention having the composition of $(Tb_{0.97}Ce_{0.03})Al_{4.9}O_{12}$ under X-ray excitation having a peak energy of 60 keV from a tungsten anode.

The present invention provides rare earth-activated scintillator having a garnet structure and containing terbium and/or lutetium. All metals disclosed herein are present in the scintillator compositions in combined form, usually as the oxide, rather than in elemental form. In one aspect of the present invention, the scintillators are responsive to X-ray excitation and have high light output, reduced afterglow, short decay time, and high X-ray stopping power.

As used herein, the term "light output" is the quantity of visible light emitted by the scintillator after being excited by a pulse of X-ray having an average intensity of about 33 keV, a peak intensity of 60 keV, and having a duration of 500 milliseconds. For ease of comparison, the light output presented in this disclosure is a relative quantity compared to the light output of an established standard europium-activated yttrium gadolinium oxide scintillator. The term "afterglow" is the light intensity emitted by the scintillator at 100 milliseconds after the X-ray excitation ceases, reported as a percentage of the light emitted while the scintillator is excited by the X radiation. The term "decay time," "primary decay," or "primary speed" is the time required for the intensity of the light emitted decreases to about 36.8% (or 1/e) of the light intensity at the time after the X-ray excitation ceases. The term "stopping power" refers to the ability of a material to absorb X-radiation, commonly called the attenuation or absorption. A material having a high stopping power allows little or no X-radiation to pass through. The stopping power is directly related to the density of the scintillator and the elements contained therein. Thus, it is advantageous to produce scintillators having high density. The term "radiation damage" refers to the characteristic of a luminescent material in which the quantity of light emitted by the luminescent material in response to a given intensity of stimulating radiation changes after the material has been exposed to a high radiation dose.

Higher light output is advantageous because a lower amount of X-ray excitation energy is required. Thus, the patient is exposed to a lower dose of X-ray energy. Reduced afterglow is advantageous because the image is sharper and free from image artifacts, sometimes referred to as "ghost images." Shorter decay time is preferred because the scan time can be reduced, resulting in more efficient use of the CT system. Higher stopping power is preferred because only a smaller quantity of scintillator is needed. Thus, thinner detectors are possible, resulting in lower cost of manufacture. Low radiation damage is advantageous because the sensitivity of the scintillator to exciting radiation remains substantially constant over a long-term use.

The present invention provides a garnet scintillator that is efficiently excitable by X-radiation and efficiently emits light in the visible range having a broad spectrum from blue to red (from about 500 nm to about 770 nm). The scintillator has an emission peak in the green to yellow range (from about 540 nm to about 600 nm), which includes the range of maximum sensitivity of X-ray image intensifiers and photodetectors. The scintillator of the present invention is a rare earth-activated garnet containing terbium and/or lutetium having a general formula $(G_{1-x-y}A_xRE_y)_a D_zO_{12}$, wherein G is at least one metal selected from the group consisting of Tb and Lu; A is a member selected from the group consisting of Y, La, Gd, Lu, and Yb when G is Tb and selected from the group consisting of Y, La, Gd, Tb, and Yb when G is Lu; RE is at least one member selected from the group consisting of Ce, Pr, Nd, Sm, Eu, Dy, Ho, Er, and Tm; D is at least one member selected from the group consisting of Al, Ga, and In; a is in the range from about 2.8 to and including 3, preferably from about 2.9 to and including 3; x is in the range from 0 to about 0.5, preferably from 0 to about 0.3, more preferably from 0 to about 0.2; and y is in the range from about 0.0005 to about 0.2, preferably from about 0.005 to about 0.1, more preferably from about 0.005 to about 0.07; and z is in the range from about 4 to and including 5, preferably from about 4.5 to and including 5, more preferably from about 4.6 to and including 5. In one embodiment, the scintillator composition comprises praseodymium, which exists in the scintillator composition as praseodymium oxide in an amount from about 2 to about 500 mole parts per million ("ppm").

In one preferred embodiment, the scintillator is terbium aluminum garnet activated with cerium having the formula $(Tb_{1-y}Ce_y)_aAl_{4.9}O_{12}$ where y takes the values as defined above and a is in the range from about 2.8 to and including 3.

In another preferred embodiment of the present invention, terbium is partially substituted with lutetium, and the scintillator has the formula of $(Tb_{1-x-y}Lu_xCe_y)_aAl_{4.9}O_{12}$, wherein a, x, and y take the values as defined above.

In still another preferred embodiment of the present invention, the scintillator has the formula of $(Tb_{1-x}Lu_xCe_y)_3Al_5O_{12}$; where $0<x \leq 0.5$, and y is defined above.

In another preferred embodiment, aluminum is partially substituted with gallium, indium, or a combination thereof. In this case, the scintillator has the formula of $(Tb_{1-y}Ce_y)_3(Al_{1-r-s}Ga_rIn_s)_zO_{12}$ where y and z are defined above and $0 \leq r \leq 0.5$ when $0 < s \leq 0.5$ and $r+s<1$, or $0 < r \leq 0.5$ when $0 \leq s \leq 0.5$ and $r+s<1$. Preferably, r is in a range from about 0.005 to about 0.3 and more preferably from about 0.05 to about 0.2; and s is preferably in a range from about 0.005 to about 0.3 and more preferably from about 0.05 to about 0.2.

In another preferred embodiment, terbium is partially substituted by one of Y, Gd, Sm, or a combination thereof and aluminum is not substituted. In this case, the scintillator has the formula of $(Tb_{1-y-u-v-w}Ce_yY_uGd_vSm_w)_3Al_zO_{12}$ where y and z are defined above, $0 \leq u, v, w \leq 0.5$, and $0.0005 \leq y+u+v+w<1$. Each of u, v, and w is preferably in a range from about 0.005 to about 0.3 and more preferably from about 0.005 to about 0.1.

In still another preferred embodiment, the scintillator has the formula of $(Tb_{1-x-y}A_xCe_y)_3Al_zO_{12}$, where A is Y or Gd, $0<x \leq 0.5$, and y and z are defined above.

A scintillator composition of the present invention may be prepared by a dry or wet synthesis method. A scintillator of the present invention useful for a detection of high-energy radiation such as X, β, or γ radiation is produced by a dry synthesis method comprising the steps of: (1) providing amounts of oxygen-containing compounds of at least one first metal selected from the group consisting of terbium and lutetium; oxygen-containing compounds of at least one rare-earth metal selected from the group consisting of Y, La, Ce, Pr, Nd, Sm, Eu, Gd, Dy, Ho, Er, Tm, and Yb; and oxygen-containing compounds of at least one second metal selected from the group consisting of Al, Ga, and In; the amounts of oxygen-containing compounds being selected such that the final composition of the scintillator is achieved; (2) mixing together the oxygen-containing compounds to form a mixture; and (3) firing the mixture in a reducing atmosphere at a temperature and for a time sufficient to convert the mixture to a rare earth-activated terbium-containing garnet scintillator.

In another aspect of the present invention, an amount of a compound selected from the group consisting of halides and carbonates of at least one metal selected from the group consisting of Tb, Lu, Y, La, Ce, Pr, Nd, Sm, Eu, Gd, Dy, Ho, Er, Tm, Yb, Na, K, Rb, and Cs is added as a fluxing agent into the mixture of the oxygen-containing compounds before or during the step of mixing. A quantity of a halide or a carbonate compound of less than about 20, preferably less than about 10 percent by weight of the total weight of the mixture is adequate for fluxing purposes. A preferred halide is fluoride. When an alkali halide or carbonate is used as a fluxing agent, the scintillator may be preferably washed to remove residual soluble alkali metal compounds and dried before it is used.

The oxygen-containing compounds may be mixed together by any mechanical method including, but not limited to, stirring or blending in a high-speed blender or a ribbon blender. The oxygen-containing compounds may be combined and pulverized together in a bowl mill, a hammer mill, or a jet mill. The mixing may be carried out by wet milling especially when the mixture of the oxygen-containing compounds is to be made into a solution for subsequent precipitation. If the mixture is wet, it may be dried first before being fired under a reducing atmosphere at a firing temperature from about 900° C. to about 1700° C., preferably from about 1000° C. to about 1600° C., more preferably from about 1200° C. to about 1500° C. for a time sufficient to convert all of the mixture to the final garnet composition. The drying may be conducted at atmospheric or subatmospheric pressure in air or under a flow of a suitable gas including inert gases and mixtures of air and inert gases at a temperature sufficient to remove a portion of or substantially all solvent used in the wet milling process. The firing may be conducted in a batchwise or continuous process, preferably with a stirring or mixing action to promote good gas-solid contact. The firing time depends on the quantity of the mixture to be fired, the rate of gas conducted through the firing equipment, and the quality of the gas-solid contact in the firing equipment. Typically, a firing time up to about 10 hours is adequate. The reducing atmosphere typically comprises a reducing gas such as hydrogen, carbon monoxide, or a combination thereof, optionally diluted with an inert gas, such as nitrogen, helium, neon, argon, krypton, xenon, or a combination thereof. Alternatively, the crucible containing the mixture may be packed in a second closed crucible containing high-purity carbon particles and fired in air so that the carbon particles react with the limited amount of oxygen present in the atmosphere inside crucible, thereby, generating carbon monoxide that is needed to provide the reducing atmosphere. The fired material may be pulverized afterward to provide a scintillator in a powder form for further processing into X-ray detector elements. The powder may be cast with the addition of a binder into a green element, then further sintered at temperature in the range of from about 1500° C. to about 1800° C. to increase the density of the element.

EXAMPLE 1

The following quantities of oxides of terbium, cerium, and aluminum and aluminum fluoride were dry blended thoroughly.

$Tb_4O_7$:6.805 g
$CeO_2$:0.194 g
$Al_2O_3$:3.062 g
$AlF_3$:0.105 g

Figure 2:
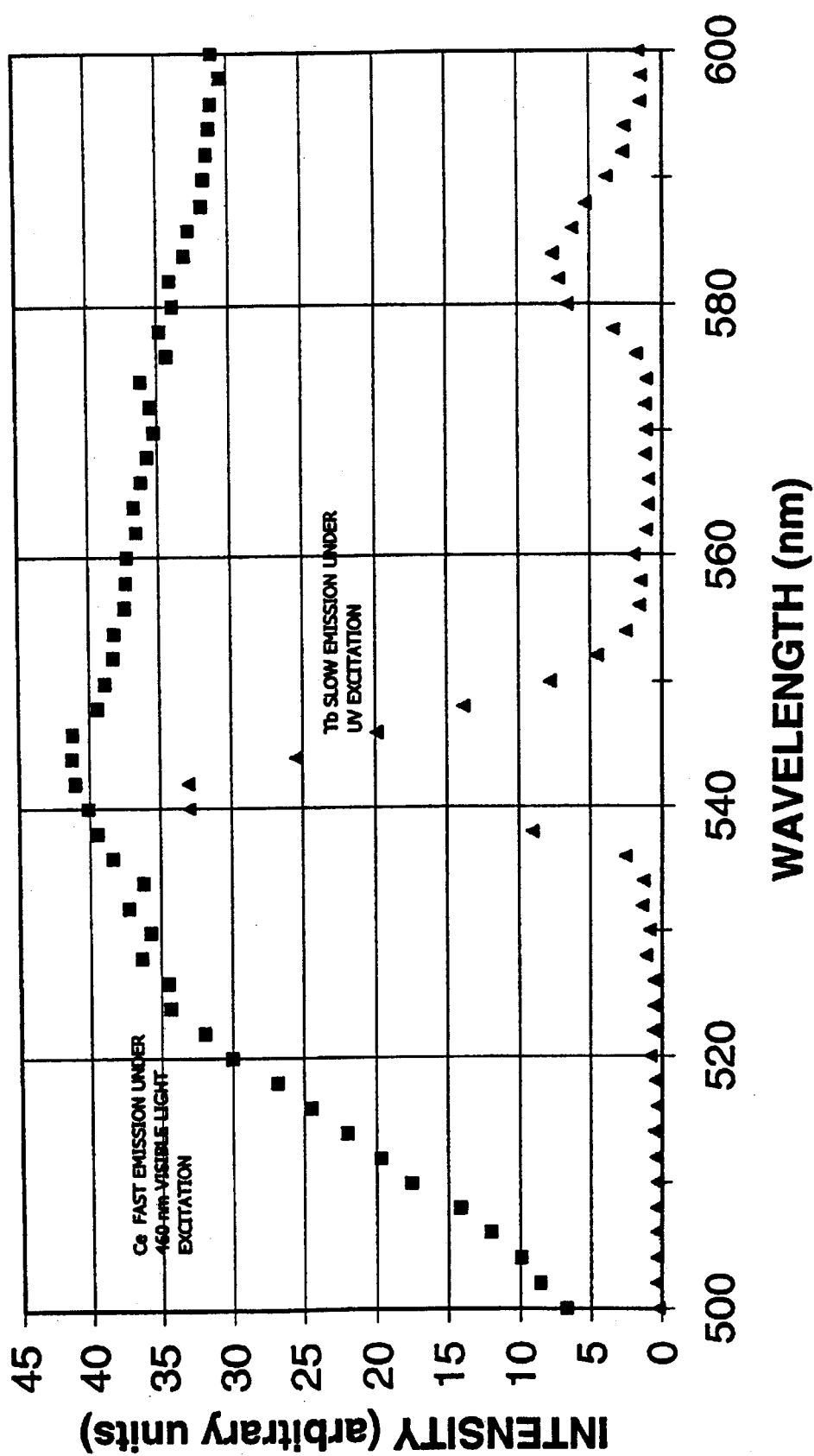
FIG. 2 shows an emission spectrum of the same scintillator under excitation by blue light having a wavelength of 460 nm.

This mixture was placed in a first crucible which is placed inside a second closed crucible containing particles of a coconut charcoal were packed with the mixture, and the combined mixture was fired at 1450° C. for 5 hours in a reducing atmosphere which is a combination of 10% (by volume) $H_2$ in nitrogen and gas generated by the reaction of coconut charcoal in a box furnace. At the end of 5 hours, the solid was cooled under the same flow of $H_2/N_2$ mixture. The final scintillator has the composition of $(Tb_{0.97}Ce_{0.03})_3Al_{4.9}O_{12}$, as determined by elemental analysis. Excitation spectrum and emission spectrum of the scintillator under excitation by X-ray and blue light having a wavelength of 460 nm were measured and shown in FIGS. 1 and 2, respectively. The scintillator of the present invention shows a broad spectrum of emission in the visible range from about 500 nm to about 770 nm in response to excitation by X radiation. Thus, the emission covers the range from blue-green to red light. Therefore, a scintillator of the present invention is very suitable for detection of X radiation by incorporation in an X-ray image intensifier or a photodetector.

EXAMPLE 2

A scintillator composition having the formula of $(Tb_{0.72}Lu_{0.25}Ce_{0.03})_3Al_{4.09}O_{12}$ was prepared by the dry synthesis method of Example 1, except that the following amounts were used:
$Tb_4O_7$:4.976 g
$CeO_2$:0.191 g
$Lu_2O_3$:1.839 g
$Al_2O_3$:3.016 g
$AlF_3$:0.103 g

EXAMPLE 3

A scintillator composition having the formula of $(Tb_{0.47}Lu_{0.5}Ce_{0.03})_3Al_{4.9}O_{12}$ was prepared by the dry synthesis method of Example 1, except that the following amounts were used:
$Tb_4O_7$:3.201 g
$CeO_2$:0.188 g
$Lu_2O_3$:3.625 g
$Al_2O_3$:2.972 g
$AlF_3$:0.102 g One or more of the starting materials for the aforementioned scintillator synthesis may be oxygen-containing compounds other than oxides, such as nitrates, sulfates, acetates, citrates, chlorates, or perchlorates. For example, amounts of $Tb_4O_7$, $Al(NO_3)_3 \cdot 9H_2O$, $Ce(NO_3)_3 \cdot 6H_2O$ and $AlF_3$ are blended and dissolved in a nitric acid solution. The strength of the acid solution is chosen to rapidly dissolve the oxygen-containing compounds and the choice is within the skill of a person skilled in the art. Ammonium hydroxide is then added in increments to the acidic solution containing Tb, Ce, and Al while stirring to precipitate a mixture of hydroxides of Tb, Ce, and Al. An organic base; such as methanolamine, ethanolamine, propanolamine, dimethanolamine, diethanolamine, dipropanolamine, trimethanolamine, triethanolamine, or tripropanolamine; may be used in place of ammonium hydroxide. The precipitate is filtered, washed with deionized water, and dried. The dried precipitate is ball milled or otherwise thoroughly blended and then calcined in air at about 400° C. to about 1600° C. for a sufficient time to ensure a substantially complete dehydration of the starting material. The calcination may be carried out at a constant temperature. Alternatively, the calcination temperature may be ramped from ambient to and held at the final temperature for the duration of the calcination. The calcined material is similarly fired at 1200–1600° C. for a sufficient time under a reducing atmosphere such as $H_2$, CO, or a mixture of one of these gases with an inert gas, or an atmosphere generated by a reaction between a coconut charcoal and the products of the decomposition of the oxygen-containing compounds to covert all of the calcined material to the desired scintillator composition.

Figure 3:
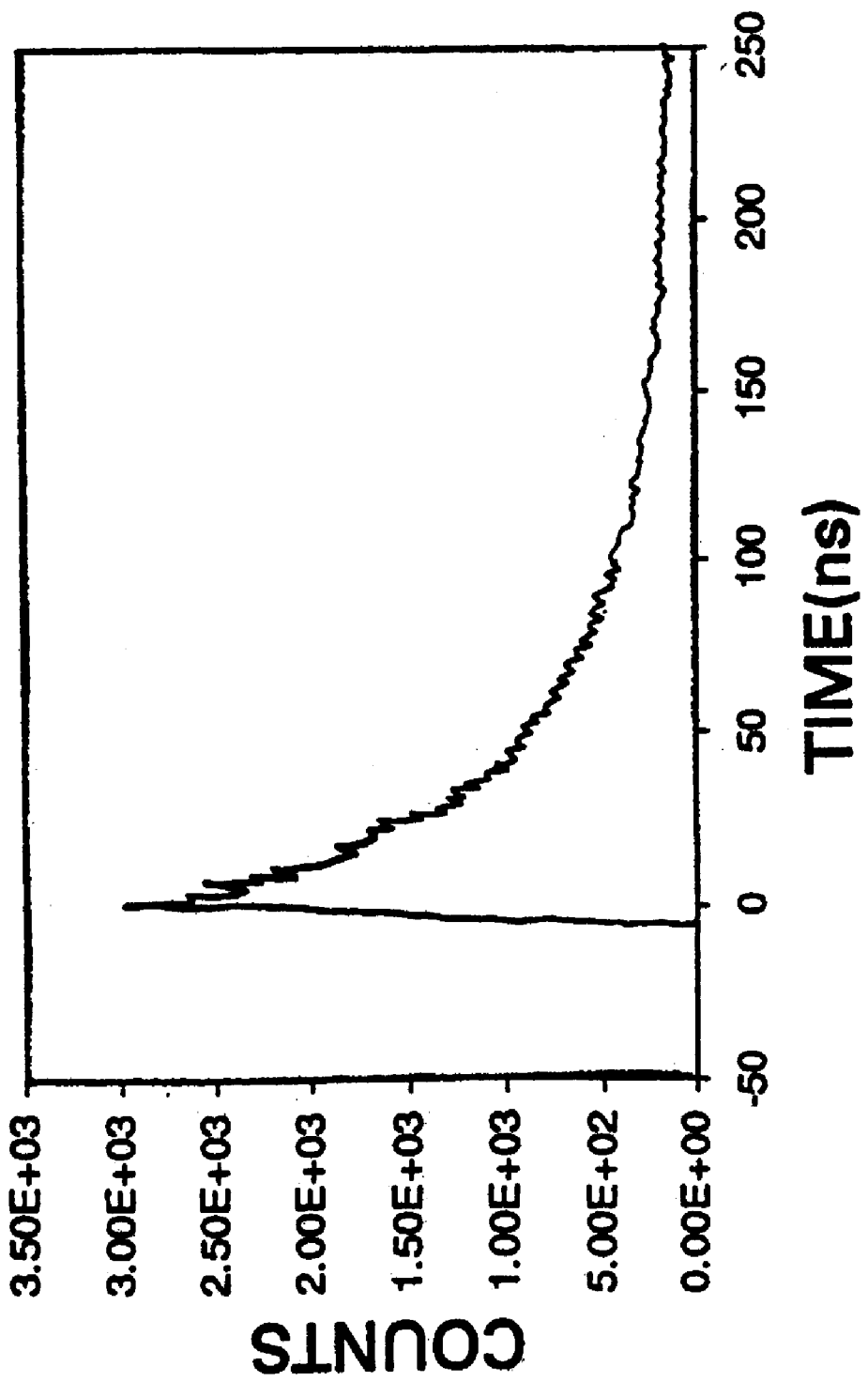
FIG. 3 shows the decay in emission at wavelength of 570 nm from the same scintillator after having been excited by electromagnetic radiation having a wavelength of 460 nm.

FIG. 3 shows the decay of the emission of visible light at 570 nm wavelength by the scintillator of Example 1 after having been excited by blue light having a wavelength of 460 nm. It is evident that the primary speed of this scintillator is less than 50 nanoseconds. In comparison, known commercial scintillators typically have primary speed in the range of microseconds. Thus, the emission from scintillators of the present invention decays at about two to three orders of magnitude faster than some known commercial scintillators. This comparison can be semi-quantitatively made with some dopant species in some specific scintillators, such as cerium dopant in terbium aluminum garnet scintillator, because the luminescence quantum efficiency of the $Ce^{3+}$ ion is known to be very high (>80%) and thus the non-radiative processes do not result in a significant increase in the observe scintillator primary speed. Since the X-ray emission spectrum shows predominantly the $Ce^{3+}$ emission, the decay of emission upon excitation by visible light can definitively provide a magnitude for the primary speed of the Ce-activated scintillators. This is conveniently measured at excitation wavelength of 460 nm and probed for emission at wavelength of 570 nm.

Other scintillators of the present invention were also made with terbium partially substituted by lutetium as disclosed in Examples 2 and 3 and showed advantageous properties in light output, afterglow, and speed, as shown in Table 1. The light output, as shown in Table 1, is a relative quantity compared to an established standard europium-doped yttrium gadolinium oxide scintillator (assigned a relative value of 1).

TABLE 1

| Compostion | Light Output | Afterglow (%) | Speed (microseconds) | Stopping Power (1/cm at 70 keV) |
|---|---|---|---|---|
| $(Tb_{0.97}Ce_{0.03})_3Al_{4.9}O_{12}$ | 3 | 0.04 | 0.044 | 30.0 |
| $(Tb_{0.72}Lu_{0.25}Ce_{0.03})_3Al_{4.9}O_{12}$ | 2 | 0.02 | 0.68 | 33.1 |
| $(Tb_{0.47}Lu_{0.5}Ce_{0.03})_3Al_{4.9}O_{12}$ | 1.8 | 0.05 | 0.09 | 36.2 |
| $(Lu_{0.97}Ce_{0.03})_3Al_5O_{12}$ | 1.6 | 1.84 | 0.06 | 42.6 |

Table 1 shows that scintillators of the present invention have much higher light output compared to the standard europium-doped yttrium gadolinium oxide scintillator and decay time much shorter than the acceptable level of 500 microseconds. In addition, when terbium is partially substituted by lutetium, the afterglow can be drastically reduced.

The wet process of preparation comprises the steps of (1) preparing a first solution having appropriate amounts of (a) compounds of at least one first metal selected from the group consisting of terbium and lutetium, (b) compounds of at least one rare-earth element selected from the group consisting of Y, La, Ce, Pr, Nd, Sm, Eu, Gd, Dy, Ho, Er, Tm, and Yb, and (c) at least one compound of at least one second metal selected from the group consisting of aluminum, gallium, and indium; (2) providing a second solution selected from the group consisting of ammonium hydroxide, hydroxides of at least one metal selected from the group consisting of Tb, Y, La, Ce, Pr, Nd, Sm, Eu, Gd, Dy, Ho, Er, Tm, Yb, Lu, Al, Ga, and In; alkyl esters of a dicarboxylic acid selected from the group consisting of oxalic acid, malonic acid, succinic acid, and glutaric acid; and amines selected from the group consisting of methanolamine, ethanolamine, propanolamine, dimethanolamine, diethanolamine, dipropanolamine, trimethanolamine, triethanolamine, and tripropanolamine; and mixture thereof; (3) mixing the first solution into the second solution to precipitate a mixture of oxygen-containing compounds of at least one first metal selected from the group consisting of terbium and lutetium; at least one rare-earth metal selected from the group consisting of Y, La, Ce, Pr, Nd, Sm, Eu, Gd, Dy, Ho, Er, Tm, Yb, and Lu; and at least one second metal selected from the group consisting of Al, Ga, and In; (4) separating the precipitate mixture from the supernatant liquid; (5) drying the precipitate mixture; (5) optionally calcining in an oxygen-containing atmosphere; and (6) firing the calcined material at a temperature for a time sufficient to convert the calcined material to a rare-earth activated scintillator containing terbium and/or lutetium. One or more compounds of halides or carbonates of Y, La, Ce, Pr, Nd, Sm, Eu, Gd, Tb, Dy, Ho, Er, Tm, Yb, Lu, Al, Ga, In, Na, K, Rb, and Cs may be added in a minor amount into the first solution, such as up to about 2 mole percent, to act as a fluxing compound during the firing of the mixture. The first solution may be added slowly, such as drop-wise, into the second solution while the second solution is stirred. Calcination may be carried out at a temperature in the range from about 400° C. to about 900° C. under an atmosphere of oxygen-containing gas, such as air, oxygen, or a mixture of oxygen and an inert gas selected from the group consisting of nitrogen, helium, neon, argon, krypton, and xenon. The firing may be carried out under a condition as stated above. The calcination and firing atmosphere may be the same or may have different compositions. The calcination and firing steps may be conducted in a batch-wise or continuous process with a static or flowing gas atmosphere. After firing, a scintillator of the present invention may be further pulverized to produce the scintillator in the powder form which can be pressed into compacted scintillators for use in detectors of X-ray CT systems. The powder may be compacted by a method such as hot pressing or hot isostatic pressing into desired shaped bodies.

In another aspect of the present invention, the composition of the scintillator and the firing temperatures are chosen such that the final scintillator is substantially a solid solution. A solid solution is most preferred because the X-ray detecting element would have a substantially uniform composition, refractive index, and higher light output.

Alternatively, a scintillator that has a composition suitable for single crystal growth may be produced in single crystal form. In this process, a seed crystal of the desired composition is introduced into a saturated solution containing appropriate compounds and new crystalline material is allowed to grow and add to the seed crystal using any well-known crystal growth method. For example, single crystals may be grown that have an approximate composition of $(Tb_{0.75}Lu_{0.25})_3Al_5O_{12}$:Ce.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. A scintillator composition having a formula of $(Lu_{1-y}Ce_y)_aD_zO_{12}$; wherein D is at least one metal selected from the group consisting of Al, Ga, and In; a is in a range from about 2.8 to and including 3; y is in a range from about 0.0005 to about 0.2; and z is in a range from about 4 to less than 5.

2. A scintillator composition having a formula of $(G_{1-x-y}A_xRE_y)_aD_zO_{12}$; wherein G is a combination of Tb and Lu; A is at least one rare earth metal selected from the group consisting of Y, La, Gd, and Yb; RE is at least one rare earth metal selected from the group consisting of Ce, Pr, Nd, Sm, Eu, Dy, Ho, Er, and Tm; D is at least one metal selected from the group consisting of Al, Ga, and In; a is a range from about 2.8 to and including 3; x is in a range from 0 to about 0.5; y is in a range from about 0.0005 to about 0.2; and z is in a range from about 4 to less than 5; wherein Lu comprises at least about 25 atom percent of a combination of elements represented by G, A, and RE.

3. The scintillator composition according to claim 2, wherein a is in a range from about 2.9 to and including 3.

4. The scintillator composition according to claim 2, wherein x is in a range from 0 to about 0.3.

5. The scintillator composition according to claim 2, wherein y is in a range from about 0.005 to about 0.1.

6. The scintillator composition according to claim 2, wherein z is in a range from about 4.5 to less than 5.

7. The scintillator composition according to claim 2, wherein the scintillator composition further comprises praseodymium oxide in an amount from about 2 to about 500 mole parts per million ("ppm").

8. The scintillator composition according to claim 2, wherein x is in a range from 0 to about 0.2.

9. The scintillator composition according to claim 2, wherein y is in a range from about 0.005 to about 0.07.

10. The scintillator composition according to claim 2, wherein z is in a range from to less than 5.

11. A method for producing a garnet scintillator composition, said method comprising the steps of:
   (1) providing amounts of:
      (a) oxygen-containing compounds of terbium and lutetium;
      (b) oxygen-containing compounds of at least one rare-earth metal selected from the group consisting of Ce, Pr, Nd, Sm, Eu, Dy, Ho, Er, and Tm; and
      (c) oxygen-containing compounds of at least one second metal selected from the group consisting of Al, Ga, and In;
   (2) mixing together said oxygen-containing compounds to form a mixture; and
   (3) firing said mixture in a reducing atmosphere at a temperature for a time sufficient to convert said mixture to a rare earth-activated garnet scintillator composition;
   wherein said amounts of oxygen-containing compounds are chosen to obtain the final desired composition of said garnet scintillator; said garnet scintillator is capable of emitting visible light in response to an excitation of high-energy radiation selected from the group consisting of X, β, and γ radiation; and said final desired composition has a formula of $(G_{1-x-y}A_xRE_y)_aD_zO_{12}$; wherein G is a combination of Tb and Lu; A is at least one rare earth metal selected from the group consisting of Y, La, Gd, and Yb; RE is at least one rare earth metal selected from the group consisting of Ce, Pr, Nd, Sm, Eu, Dy, Ho, Er, and Tm; D is at least one metal selected from the group consisting of Al, Ga, and In; a is a range from about 2.8 to and including 3; x is in a range from 0 to about 0.5; y is in a range from about 0.0005 to about 0.2; and z is in a range from about 4 to less than 5; wherein Lu comprises at least about 25 atom Percent of a combination of elements represented by G, A, and RE.

12. The method according to claim 11 further comprising the step of mixing at least one compound selected from the group consisting of halides and carbonates of at least one metal selected from the group consisting of Tb, Lu, Al, Ga, In, Y, La, Ce, Pr, Nd, Sm, Eu, Gd, Dy, Ho, Er, Tm, Yb, Na, K, Rb, and Cs in said mixture in a quantity sufficient to act as a flux during said firing.

13. The method according to claim 12, wherein said quantity of said compound is less than about 20 percent by weight of a total weight of said mixture.

14. The method according to claim 11, wherein said reducing atmosphere comprises a gas selected from the group consisting of hydrogen, carbon monoxide, and mixtures thereof and an inert gas selected from the group consisting of nitrogen, helium, neon, argon, krypton, and xenon.

15. The method according to claim 11, wherein said temperature is in a range from about 900° C. to about 1600° C.

16. The method according to claim 15, wherein said temperature is from about 1000° C. to about 1500° C.

17. A method for producing a garnet scintillator composition, said method comprising the steps of:
  (1) preparing a first solution from amounts of:
    (a) compounds of at least one first metal selected from the group consisting of Tb and Lu;
    (b) compounds of at least one rare-earth metal selected from the group consisting of Y, La, Ce, Pr, Nd, Sm, Eu, Gd, Dy, Ho, Er, Tm, and Yb; and
    (c) at least one compound of at least one second metal selected from the group consisting of Al, Ga, and In;
  (2) providing a second solution selected from the group consisting of ammonium hydroxide, hydroxides of at least one of Tb, Lu, Y, La, Ce, Pr, Nd, Sm, Eu, Gd, Dy, Ho, Er, Tm, Yb, Al, Ga, and In; alkyl esters of a dicarboxylic acid selected from the group consisting of oxalic acid, malonic acid, succinic acid, and glutaric acid; amines selected from the group consisting of methanolamine, ethanolamine, propanolamine, dimethanolamine, diethanolamine, dipropanolamine, trimethanolamine, triethanolamine, and tripropanolamine; and mixtures thereof;
  (3) mixing together said first solution and said second solution to form a precipitate mixture of oxygen-containing compounds of at least one first metal, at least one rare-earth metal, and at least one second metal;
  (4) separating said precipitate mixture from a supernatant liquid;
  (5) drying said separated precipitate mixture; and
  (6) firing said dried precipitate mixture in a reducing atmosphere at a temperature and for a time sufficient to convert said dried precipitate mixture to a garnet scintillator composition;
  wherein said amounts of compounds are chosen to obtain a final desired composition of said garnet scintillator, and said garnet scintillator is capable of emitting visible light in response to an excitation of high-energy radiation selected from the group consisting of X, β, and γ radiation.

18. The method according to claim 17 further comprising the step of adding at least one compound selected from the group consisting of halides and carbonates of at least one metal selected from the group consisting of Tb, Lu, Al, Ga, In, Y, La, Ce, Pr, Nd, Sm, Eu, Gd, Dy, Ho, Er, Tm, Yb, Na, K, Rb, and Cs in said first solution in a quantity sufficient to act as a flux during said firing.

19. The method according to claim 18, wherein said quantity of said compound is up to about 2 mole percent.

20. The method according to claim 17 further comprising the step of calcining said dried precipitate mixture in atmosphere containing oxygen at a temperature in a range from about 400° C. to about 900° C. before the firing step.

21. The method according to claim 17, wherein said firing is conducted at a temperature in a range from about 900° C. to about 1600° C.

22. The method according to claim 21, wherein said temperature is in a range from about 1000° C. to about 1500° C.

23. A detector element of an X-ray CT scanner, said detector element comprising a garnet scintillator composition that comprises at least one metal selected from the group consisting of terbium and lutetium; said garnet being activated with at least one rare-earth metal selected from the group consisting of Ce, Nd, Sm, Eu, Dy, Ho, Er, and Tm; said scintillator being capable of emitting visible light in response to high-energy radiation selected from the group consisting of X, β, and γ radiation.

24. A detector element of an X-ray CT scanner, said detector element comprising a garnet scintillator composition having a formula of $(Tb_{1-y}Ce_y)_a D_z O_{12}$; wherein D is at least one metal selected from the group consisting of Al, Ga, and In; a is in a range from about 2.8 to and including 3; y is in a range from about 0.0005 to about 0.2; and z is in a range from about 4 to and including 5.

25. A detector element of an X-ray CT scanner, said detector element comprising a garnet scintillator composition having a formula of $(Lu_{1-y}Ce_y)_a D_z O_{12}$; wherein D is at least one metal selected from the group consisting of Al, Ga, and In; a is in a range from about 2.8 to and including 3; y is in a range from about 0.0005 to about 0.2; and z is in a range from about 4 to and including 5.

26. A detector element of an X-ray CT scanner, said detector element comprising a garnet scintillator composition having a formula of $(G_{1-x-y}A_x RE_y)_a D_z O_{12}$; wherein G is at least one metal selected from the group consisting of Tb and Lu; A is at least one rare earth metal selected from the group consisting of Y, La, Gd, Lu, and Yb when G is Tb and selected from the group consisting of Y, La, Gd, Tb, and Yb when G is Lu; RE is at least one rare earth metal selected from the group consisting of Ce, Pr, Nd, Sm, Eu, Dy, Ho, Er, and Tm; D is at least one metal selected from the group consisting of Al, Ga, and In; a is a range from about 2.8 to and including 3; x is in a range from 0 to about 0.5; y is in a range from about 0.0005 to about 0.2; and z is in a range from about 4 to and including 5.

27. A detector element of an X-ray CT scanner of claim 26, wherein A is Lu, RE is Ce, and D is Al.

28. A scintillator composition comprising a garnet that comprises lutetium; said garnet being activated with at least one rare-earth metal selected from the group consisting of Ce, Nd, Sm, Eu, Dy, Ho, Er, and Tm; said scintillator being capable of emitting visible light in response to high-energy radiation selected from the group consisting of X, β, and γ radiation.

29. A scintillator composition having a formula of $(G_{1-x-y} A_x RE_y)_a D_z O_{12}$; wherein G is Lu; A is at least one rare earth metal selected from the group consisting of Y, La, Gd, Tb, and Yb; RE is at least one rare earth metal selected from the group consisting of Ce, Nd, Sm, Eu, Dy, Ho, Er, and Tm; D is at least one metal selected from the group consisting of Al, Ga, and In; a is a range from about 2.8 to less than 3; x is in a range from 0 to about 0.5; y is in a range from about 0.0005 to about 0.2; and z is in a range from about 4 to and including 5.

30. A method for detecting X-radiation, said method comprising:

allowing said X-radiation to excite a scintillator composition comprising a garnet that comprises at least one metal selected from the group consisting of terbium and lutetium; said garnet being activated with at least one rare-earth metal selected from the group consisting of Ce, Nd, Sm, Eu, Dy, Ho, Er, and Tm; and observing visible light emitted by said scintillator composition upon being excited by said X-radiation.

31. A method for detecting X-radiation, said method comprising:

allowing said X-radiation to excite a scintillator composition comprising a garnet having a formula of $(G_{1-x-y}A_xRE_y)_aD_zO_{12}$; wherein G is at least one metal selected from the group consisting of Tb and Lu; A is at least one rare earth metal selected from the group consisting of Y, La, Gd, Lu, and Yb when G is Tb, and selected from the group consisting of Y, La, Gd, Tb, and Yb when G is Lu; RE is at least one rare earth metal selected from the group consisting of Ce, Nd, Sm, Eu, Dy, Ho, Er, and Tm; D is at least one metal selected from the group consisting of Al, Ga, and In; a is a range from about 2.8 to and including 3; x is in a range from 0 to about 0.5; y is in a range from about 0.0005 to about 0.2; and z is in a range from about 4 to and including 5; and observing visible light emitted by said scintillator composition upon being excited by said X-radiation.

32. A scintillator composition having a formula of $(Tb_{0.72}Lu_{0.25}Ce_{0.03})_3Al_{4.9}O_{12}$.

33. A scintillator composition having a formula of $(Tb_{0.47}Lu_{0.5}Ce_{0.03})_3Al_{4.9}O_{12}$.

* * * * *